US010296477B2

(12) United States Patent
Prentice

(10) Patent No.: US 10,296,477 B2
(45) Date of Patent: May 21, 2019

(54) DATA BUS LOGGER

(71) Applicant: The United States of America, as represented by the Secretary of the Air Force, Washington, DC (US)

(72) Inventor: David C. Prentice, Springboro, OH (US)

(73) Assignee: United States of America as represented by the Secretary of the AirForce, Washington, DC (US)

( * ) Notice: Subject to any disclaimer, the term of this patent is extended or adjusted under 35 U.S.C. 154(b) by 0 days.

(21) Appl. No.: 15/729,976

(22) Filed: Oct. 11, 2017

(65) Prior Publication Data

US 2018/0285300 A1    Oct. 4, 2018

Related U.S. Application Data

(60) Provisional application No. 62/478,849, filed on Mar. 30, 2017.

(51) Int. Cl.
*G06F 13/40* (2006.01)
*G06F 13/16* (2006.01)
*G06F 13/12* (2006.01)

(52) U.S. Cl.
CPC ........ *G06F 13/4018* (2013.01); *G06F 13/124* (2013.01); *G06F 13/1694* (2013.01); *G06F 13/4022* (2013.01)

(58) Field of Classification Search
CPC ................ G06F 13/4022; H04L 2012/4028
See application file for complete search history.

(56) References Cited

U.S. PATENT DOCUMENTS

| 5,093,910 A | 3/1992 | Tulpule et al. |
| 5,113,499 A | 5/1992 | Ankney et al. |

(Continued)

FOREIGN PATENT DOCUMENTS

| WO | WO2014/139406 | 9/2014 |
| WO | WO2016/165683 | 10/2016 |
| WO | WO2017/050150 | 3/2017 |

OTHER PUBLICATIONS

Department of Defense US, MIL-STD-1553B, Military Standard: Aircraft Internal Time Division Command/Response Multiplex Data Bus (Sep. 21, 1978).

(Continued)

*Primary Examiner* — Brian T Misiura
(74) *Attorney, Agent, or Firm* — AFMCLO/JAZ

(57) ABSTRACT

A system having a data bus, bus controller(s), remote terminal(s) and a logger. The data bus has an inverted differential line and a non-inverted differential line. The bus controller(s) are electrically coupled to the data bus. The remote terminal(s) are electrically coupled to the data bus. The logger has a bus transceiver and a controller. The bus transceiver is electrically coupled to the data bus. The controller is electrically coupled to the transceiver. The controller is configured to: capture a non-inverted data stream from the bus transceiver, capture an inverted data stream from the bus transceiver, convert the non-inverted data stream into non-inverted packets having a packet size, convert the inverted data stream into inverted packets having the packet size; and write the non-inverted data packets and inverted data packets to a non-volatile memory.

17 Claims, 8 Drawing Sheets

(56) References Cited

U.S. PATENT DOCUMENTS

| | | | |
|---|---|---|---|
| 5,293,375 A | 3/1994 | Moorwood et al. | |
| 5,325,359 A | 6/1994 | Jordan et al. | |
| 5,764,895 A | 6/1998 | Chung | |
| 5,768,162 A * | 6/1998 | Rupp | G06F 11/349 702/122 |
| 5,916,300 A * | 6/1999 | Kirk | G01S 19/44 701/468 |
| 6,175,560 B1 | 1/2001 | Bhagalia et al. | |
| 6,195,768 B1 | 2/2001 | Green | |
| 6,285,298 B1 | 9/2001 | Gordon | |
| 6,778,160 B2 | 8/2004 | Kubota et al. | |
| 7,046,992 B2 | 5/2006 | Wallentin et al. | |
| 7,096,137 B2 | 8/2006 | Shipton et al. | |
| 7,194,663 B2 | 3/2007 | Fletcher et al. | |
| 7,284,272 B2 | 10/2007 | Howard et al. | |
| 7,337,465 B2 | 2/2008 | Kiyoto et al. | |
| 7,340,597 B1 * | 3/2008 | Cheriton | G06F 21/554 713/100 |
| 7,480,500 B1 | 1/2009 | Mittal | |
| 7,587,499 B1 | 9/2009 | Haghpassand | |
| 7,760,882 B2 | 7/2010 | Tidwell et al. | |
| 7,889,715 B2 | 2/2011 | Criddle et al. | |
| 7,908,480 B2 | 3/2011 | Firestone et al. | |
| 7,913,011 B2 * | 3/2011 | Emma | G06F 11/34 370/352 |
| 7,934,088 B2 | 4/2011 | Wang | |
| 8,238,551 B2 | 8/2012 | Reznik et al. | |
| 8,254,574 B2 | 8/2012 | Reznik et al. | |
| 8,312,320 B2 | 11/2012 | Almadi et al. | |
| 8,335,609 B2 * | 12/2012 | Beacham | G07C 5/0808 701/33.4 |
| 8,350,749 B1 | 1/2013 | Malas et al. | |
| 8,438,628 B2 | 5/2013 | Shah et al. | |
| 8,503,673 B2 | 8/2013 | Patwari et al. | |
| 8,515,061 B2 | 8/2013 | Patwari et al. | |
| 8,542,719 B2 * | 9/2013 | Lassini | H04L 12/4604 375/211 |
| 8,543,260 B2 * | 9/2013 | Righi | H04L 43/04 455/344 |
| 8,717,721 B2 | 5/2014 | Rostron | |
| 8,744,082 B2 | 6/2014 | Ly et al. | |
| 8,863,236 B2 | 10/2014 | Haddad et al. | |
| 8,963,741 B1 * | 2/2015 | Righi | G05B 23/0216 340/945 |
| 8,978,467 B2 * | 3/2015 | Wagner | F25D 29/003 73/432.1 |
| 9,003,052 B2 | 4/2015 | Holstein et al. | |
| 9,225,703 B2 | 12/2015 | Smithson | |
| 9,407,619 B2 | 8/2016 | Tunnell et al. | |
| 9,582,447 B2 | 2/2017 | Arehart et al. | |
| 9,633,484 B2 * | 4/2017 | Fazi | G07C 5/008 |
| 9,727,496 B1 * | 8/2017 | Parundekar | G06F 13/126 |
| 9,912,531 B2 * | 3/2018 | Neff | H04L 41/0803 |
| 2002/0174332 A1 | 11/2002 | Vialen et al. | |
| 2005/0008157 A1 | 1/2005 | Hjelm | |
| 2006/0265540 A1 | 11/2006 | Mass et al. | |
| 2008/0090572 A1 | 4/2008 | Cha et al. | |
| 2010/0333172 A1 | 12/2010 | Jiang | |
| 2014/0331287 A1 | 11/2014 | Barr | |
| 2014/0354328 A1 | 12/2014 | Hematy et al. | |
| 2015/0128205 A1 | 5/2015 | Mahaffey et al. | |
| 2015/0134947 A1 | 5/2015 | Varcoe et al. | |
| 2015/0146872 A1 | 5/2015 | Baek et al. | |
| 2015/0236844 A1 * | 8/2015 | Pan | H04L 7/0008 370/503 |
| 2015/0324506 A1 | 11/2015 | Li | |
| 2017/0026808 A1 | 1/2017 | Johnson et al. | |
| 2018/0109656 A1 * | 4/2018 | Cho | H04L 69/324 |
| 2018/0285309 A1 * | 10/2018 | Prentice | G06F 13/4286 |

OTHER PUBLICATIONS

XILINX, Spartan-6 FPGA Data Sheet:DC and Switching Characteristics, DS162 (v3.1.1), Jan. 30, 2015.
Technical Committee SD Card Association, SD Specifications Part 1 Physical Layer Simplified Specification, Ver 4.10, Jan. 22, 2013.
Diligent, Cmod A7 Reference Manual, Rev. B, Jun. 24, 2016.

* cited by examiner

| Clock | Rate | Component |
|---|---|---|
| System Clock | 100 MHz | RS-232,<br>Control Registers,<br>Card Initialization,<br>CRC calculator |
| Data Clock | 10 MHz | 1553 4 bit Packetizer |
| SD Clock | 25 MHz | SD Controller,<br>Card Initialization Commands,<br>SD Packetizer |

FIG. 5

| RAM Location | Data |
|---|---|
| 1 | Header and Communication Length |
| 2 | High bits of Timestamp |
| 3 | Low bits of Timestamp |
| 4 | Message Gap |
| 5 | BC Message |
| 6 | RT Response |
| 7 | Data Pkt 1 |
| 8 | Data Pkt 2 |
| ... | ... |
| 38 | Data Pkt 32 |

FIG. 8

DATA BUS LOGGER

CROSS REFERENCE TO RELATED APPLICATIONS

This application claims the benefit of and priority to U.S. Provisional Application Ser. No. 62/478,849, entitled "Data Bus Logger," filed on Mar. 30, 2017, the entirety of which is incorporated by reference herein.

STATEMENT OF GOVERNMENT INTEREST

The invention described herein may be manufactured and used by or for the Government of the United States for all governmental purposes without the payment of any royalty.

FIELD OF THE INVENTION

The present disclosure relates generally to data bus communications and, more particularly, to logging communications on a data bus.

BACKGROUND OF THE INVENTION

It is often difficult to determine when a fault occurs in a system having a shared data bus, particularly while running tests and during normal operations. Faults may be caused or triggered by messages that transfer data or send control messages to devices over such data buses. Shared data buses may be employed in systems such as Supervisory Data Acquisition (SCADA) systems and avionics systems that can operate according to one or more technical standards such as the RS-422 and MIL-STD-1553 standards.

To help solve faults in a system comprising a shared data bus, many vendors have created logging technologies that reside on the shared data bus and capture data packets being communicated via the bus. These logging technologies may miss bus glitches and packet collisions occurring on the monitored shared data bus because they decode messages before saving them, losing the raw (pre-decoded) signal information. For this and other reasons, when glitches are missed or collisions occur, these logging technologies can miss these anomalies.

Shared data bus logging systems may have other hurdles associated with logging data being continuously streamed. For example, the MIL-STD-1553 data bus has a throughput rate of 1 MHz or 1,000,000 samples per second, and it employs a differential pair that can double that rate up to 2 MHz. Each bus also may include a backup bus that doubles the total amount of data being transferred in the system again. Because of limitations in their storage capacity, some commercial data loggers limit the amount of data being collected to only valid data packets and do not capture all data being streamed. However, to adequately capture an entire MIL-STD-1553 bus signaling, a logging system may need to sample at an effective minimum rate of up to or about 8 MHz. Accordingly, the amount of data to be captured may add up to as much as 28.8 GB per hour.

BRIEF SUMMARY OF THE INVENTION

The foregoing problems and other shortcomings, drawbacks, and challenges associated with logging communications on a data bus are overcome by the embodiments described herein. While the invention will be described in connection with certain embodiments, it is understood that it is not limited to these embodiments. To the contrary, the present invention includes all alternatives, modifications and equivalents within the scope of the embodiments disclosed.

In one embodiment, a device is provided. The device may include a bus transceiver, a controller, and a non-volatile memory. The bus transceiver is electrically coupled to a data bus having an inverted differential line and a non-inverted differential line. The controller is electrically coupled to the transceiver. The controller is configured to: capture a non-inverted data stream from the bus transceiver; capture an inverted data stream from the bus transceiver; convert the non-inverted data stream into non-inverted packets having a packet size; convert the inverted data stream into inverted packets having the packet size; and write the non-inverted data packets and inverted data packets to the non-volatile memory.

In another embodiment, a method is provided. According to the method, a non-inverted data stream is captured from a bus transceiver electrically coupled to a data bus. An inverted data stream is captured from the bus transceiver. The non-inverted data stream is converted into non-inverted packets having a packet size. The inverted data stream is converted into inverted packets having the packet size. The non-inverted data packets and inverted data packets are written to a non-volatile memory.

In still another embodiment, a system is provided. The system includes a data bus, at least one bus controller, at least one remote terminal, and a logger. The data bus includes an inverted differential line and a non-inverted differential line. The least one bus controller is electrically coupled to the data bus. The at least one remote terminal is electrically coupled to the data bus. The logger includes a bus transceiver and a controller. The bus transceiver is electrically coupled to the data bus. The controller is electrically coupled to the transceiver. The controller is configured to case a plurality of actions. A non-inverted data stream is captured from the bus transceiver. An inverted data stream is captured from the bus transceiver. The non-inverted data stream is converted into non-inverted packets having a packet size. The inverted data stream is converted into inverted packets having the packet size. The non-inverted data packets and inverted data packets are written to a non-volatile memory.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings provide visual representations for more fully describing various embodiments of the disclosed invention. They can be used by those skilled in the art to better understand the invention and its representative embodiments as well as their inherent advantages. The drawings are not necessarily to scale; emphasis is instead placed on illustrating the principles of the devices, systems, and methods described herein. In these drawings, like reference numerals may identify corresponding elements throughout.

FIG. 5 is a table of example clock rates.

FIG. 8 is a table illustrating the order of decoded data in RAM.

DETAILED DESCRIPTION OF THE INVENTION

Figure 1:
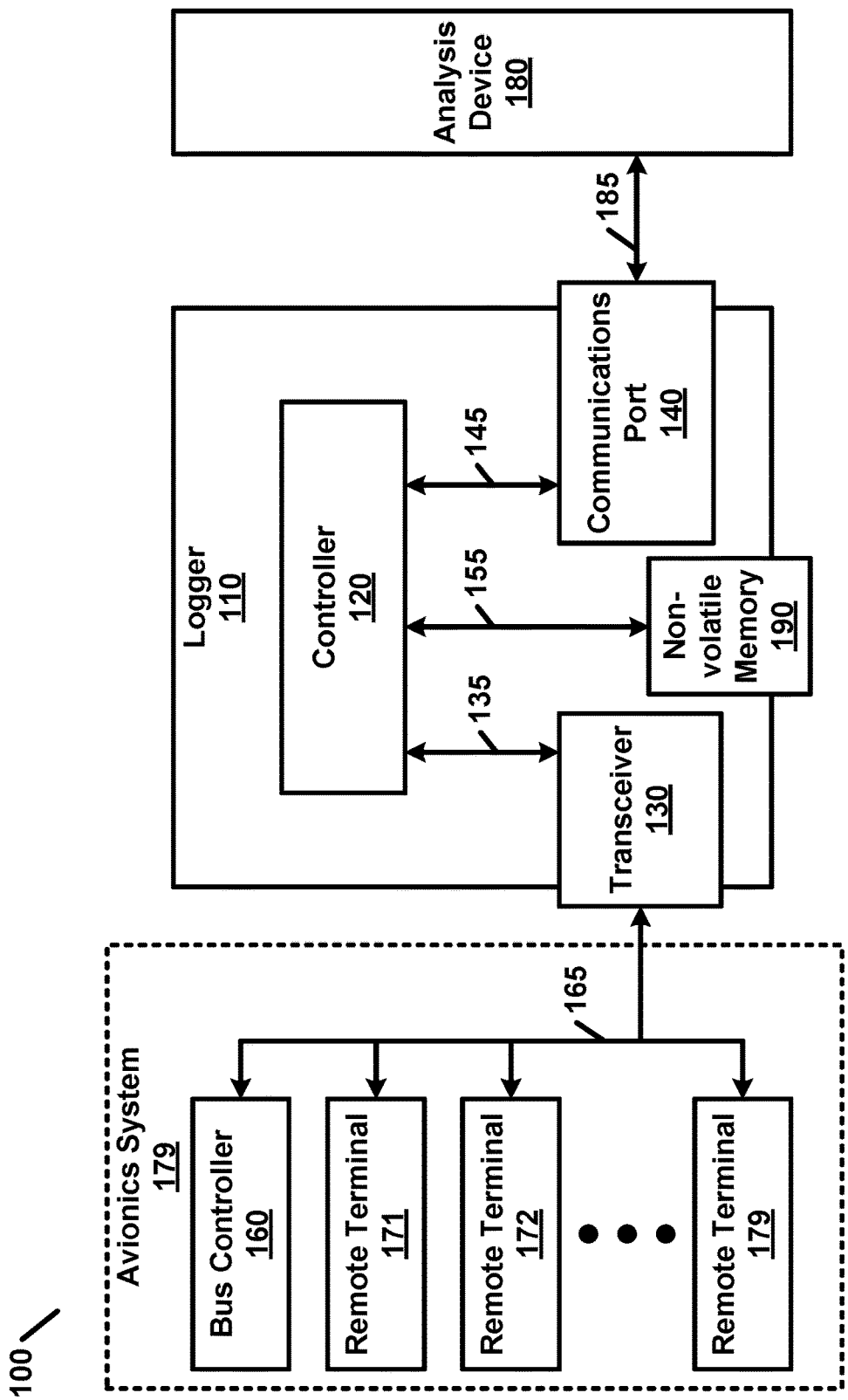
FIG. 1 is a block diagram of a system employing a data bus logging device according to one embodiment of the invention.

The various methods, systems, apparatuses, and devices described herein generally provide for improved logging of data bus communications between remote terminals of a data bus.

While this invention is susceptible of embodiments in many different forms, there is shown in the drawings and will herein be described in detail specific embodiments, with the understanding that the present disclosure is to be considered as an example of the principles of the invention and not intended to limit the invention to the specific embodiments shown and described.

Embodiments of the present invention include a data logger that may be configured to continuously digitize data streams from a plurality of differential transmission lines connected to one or more data busses, packetize the digitized data stream, and write the packetized data to non-volatile memory. Additionally, embodiments may play back the logged data in a raw mode and/or decoded mode. The logged data may be employed in post-collection analysis.

Referring now to the drawings, FIG. 1 is a block diagram of an example system, in accordance with an embodiment of the invention. As illustrated in this example, the system 100 may have a data bus 165, at least one bus controller 160, at least one remote terminal (e.g. 171, 172 . . . 179), and a logger 110 connected to data bus 165.

The data bus 165 is used to facilitate communications between bus controller 160 and remote terminals 171, 172 . . . 179. The data bus may be operating within, for example, an avionics system 190. In the context of an avionics system (e.g. 190), the bus controller 160 and remote terminals 171, 172 . . . 179 are examples of two types of line replaceable units (LRUs). It is envisioned that other LRU devices, such as logger 110 may connect to data bus 165.

Data bus 165 may be a shared data bus. A shared data bus (e.g. 160) is a data bus that is shared by multiple devices such as, for example, a bus controller (e.g. 160) and remote terminals (e.g. 171, 172 . . . 179). According to an embodiment, the data bus 165 may be a MIL-STD-1553 data bus. A MIL-STD-1553 data bus is multiplex serial data bus that conforms to the MIL-STD-1553 military standard published by the United States Department of Defense. MIL-STD-1553 defines the mechanical, electrical, and functional characteristics of a serial data bus. MIL-STD-1553 may be employed, for example, as an avionics data bus, a spacecraft data bus, an industrial data bus, and/or the like. MIL-STD-1553 employs multiple (commonly dual) redundant balanced line physical layers, a differential network interface, time division multiplexing, half-duplex command/response protocol, and may handle multiple RT devices. A version of MIL-STD-1553 using optical cabling in place of electrical cabling is known as MIL-STD-1773. It is envisioned that other data busses, such as MIL-STD-1773, RS-422, IEEE-1394, and/or the like may also be employed.

Data bus 165 may include an inverted differential line and a non-inverted differential line. The inverted differential line and a non-inverted differential line in data bus 165 are used for differential signaling. Differential signaling provides for electrically transmitting information using two complementary signals. The technique sends the same electrical signal as a differential pair of signals, each in its own conductor. The pair of conductors may comprise include wires (typically twisted together) or traces on a circuit board. The receiving circuit may respond to the electrical difference between the two signals, rather than the difference between a single wire and ground. Differential signaling may be employed to minimized data corruption between devices in data bus 165 due to electrical interference. An opposite technique, employable by an alternative embodiment, is called single-ended signaling and the embodiments described herein are also compatible with single-ended signaling.

Bus controller 160 is responsible for directing the flow of data on the data bus 165. Other devices such as remote terminals (e.g. 171, 172 . . . 179) may be capable of performing as a bus controller. However, one bus controller may generally be active at a time. Bus controller 160 issue commands onto data bus 165. The commands may be for the transfer of data or the control and management of data bus 165. Typically, bus controller 160 may be part of another device, such as, for example, a mission computer, a display processor, and/or the like.

Remote terminals (e.g. 171, 172 . . . 179) are devices that operate on data bus 165 in a capacity other than as a bus controller or as a bus monitor. Remote terminals (e.g. 171, 172 . . . 179) comprise electronics necessary to transfer data between the data bus and a subsystem. A subsystem is a sender or user of the data transferred on data bus 165. Remote terminals (e.g. 171, 172 . . . 179) may include sensors, actuators, processors, and/or the like. A remote terminal (e.g. 171, 172 . . . 179) typically includes a transceiver, an encoder/decoder, a protocol controller used to communicate over data bus 165.

Logger 110 performs two main functions: (1) logging activity on data bus 165 to non-volatile memory 190; and (2) transferring the logged data to analysis device 180. Logger 110 may perform other functions such as: generating reports, flagging anomalies, decoding messages, combinations thereof, and/or the like.

Logger 110 may have a bus transceiver 130 and a controller 120. The bus transceiver 130 may be electrically coupled to the data bus 165. In the example embodiment where data bus 165 is a MIL-STD-1553 data bus, transceiver 130 may be a MIL-STD-1553 transceiver such as a Holt IC MIL-STD-1553 transceiver (HI-2579CGTF, shown by way of example and not limitation) configured to convert the differential +/−10 volt MIL-STD-1553 bus to two 0-3.3 volt signals for the controller 120. It will be appreciated that in other embodiments where data bus 165 is not a MIL-STD 1553 data bus, that other embodiments of transceiver 130 can be used.

The MIL-STD-1553 transceiver(s) may be substantiated on a MIL-STD-1553 circuit card assembly (CCA). The CCA may have MIL-STD-1553 transceiver(s), header connector(s) to interface components, LED indicator(s) and DIP switch(s). The header connector may have 3.3V power and a ground for the card, as well as transmit and receive lines. The DIP switch(s) may be configured to enable the receive and transmit functions of the transceiver(s).

The transceiver 130 may be configured to transmit and/or receive two MIL-STD-1553 busses simultaneously. According to an embodiment, the logger 110 may further include a second bus transceiver electrically coupled to a second data bus comprising a second inverted differential line and a second non-inverted differential line. Employment of a second bus may be used for redundancy within a system. Employment of a second bus may also be used to allow a LRU to communicate, for example as bridge, between two busses in a larger architecture. An example of a larger architecture is an aircraft avionics system with multiple and/or redundant flight systems. The transceiver 130, controller 120 and other related components may be mounted to a circuit card. Examples of other related components include non-volatile memory 190, communications port 140, and/or the like. In certain embodiments, the circuit card may employ DIP switches to enable or inhibit receive and/or transmit capabilities. It is understood that the hardware employed may be configured in a variety of ways to provide some type of physically switched input(s).

The controller 120 may be electrically coupled to transceiver 130 via data bus 135. Data bus 135 may be a parallel and/or serial data bus. The controller 120 may be configured to perform a multitude of actions. Some of the actions are summarized here and explained in more detail further within this disclosure. A non-inverted data stream may be captured from the bus transceiver 130. An inverted data stream may be captured from the bus transceiver 130. The non-inverted data stream may be converted into non-inverted packets having a packet size. The inverted data stream may be converted into inverted packets having the packet size. The non-inverted data packets and inverted data packets may be written to a non-volatile memory 190.

According to some of the various embodiments, the non-volatile memory 190 may comprise a computer memory configured to retrieve stored information even after having been power cycled (turned off and back on). Examples of non-volatile memory include solid state memory (including flash memory), ferroelectric RAM, magnetic storage devices (e.g. hard disk drives, floppy disks, and magnetic tape), and optical memory. Non-volatile memories may be selected based on characteristics such as read and write times. One type of non-volatile memory that may be employed in an embodiment may comprise a Secure Digital (SD) non-volatile memory card. There are various combinations of form factors and device families of SD cards including full size and micro size SDHC and SDXC cards. SD cards may be obtained in various sizes, such as 512 GB and may be written to at speeds greater than 50 MHz depending on the type of card used.

The non-volatile memory 190 may be an SD memory card. The SD card may be removable. The non-volatile memory 350 may be an SD card configured with 4096 bit blocks. The SD card may have a fixed block transfer size such as 512 byte fixed blocks for the transfer of data to an SD Extended Capacity (SDXC) SD card.

The controller 120 may be further configured to initialize the non-volatile memory 190, via data bus 155 connecting controller 120 to the non-volatile memory 190. Data bus 155 may be a parallel and/or serial data bus. According to an embodiment, the controller 120 may be further configured to buffer the non-inverted data stream and inverted data stream.

According to an embodiment, the controller 120 may be further configured to calculate a CRC for each of the non-inverted packets and the inverted packets.

According to an embodiment, the controller 120 may be further configured to sequentially read the non-inverted data packets and the inverted data packets from the non-volatile memory 190. The controller 120 may communicate the non-inverted data packets and the inverted data packets to an analysis device 180 via a communications port 140. The controller 120 and communications port 140 communicate via data bus 145. Data bus 145 may be a parallel and/or serial data bus. According to an embodiment, communications port 140 may be a serial communications port.

According to an embodiment, the controller 120 may be further configured to read at least one of the non-inverted data packets and the inverted data packets from the non-volatile memory 190. A recovered data stream may be generated from at least one of the non-inverted data packets and the inverted data packets. The non-inverted data packets and the inverted data packets may be stitched together to reconstruct messages that may have been split and/or divided across packets. The controller 120 may be further configured to combine at least two of the non-inverted data packets and the inverted data packets. The controller 120 may decode a bus controller message from the recovered data stream. Additionally, the controller 120 may decode a remote terminal response from the recovered data packets. The bus controller 120 message and/or the remote terminal response may be communicated to the analysis device 180 via communications link 185. Communications link 185 is communicatively compatible with communications port 140. According to an embodiment, communications link 185 may be a serial communications link.

The controller 120 may be further configured to identify a sync pulse in the recovered data stream. The sync pulse may be configured to trigger the decoding of the bus controller message. The controller 120 may be further configured to store the bus controller 120 message. The controller 120 may be further configured to store the remote terminal response.

According to an embodiment, the non-inverted packets and the inverted packet may include a block number. The block number may identify an order/and or time of the non-inverted packets and the inverted packets.

According to an embodiment, logger 110, and/or parts thereof, may include a programmable device, such as, for example, a field-programmable gate array (FPGA). A FPGA is an integrated circuit designed to be configured after manufacturing. The FPGA configuration connects an array of programmable logic blocks. Logic blocks may be configured to perform combinational functions and/or simpler logic gates like AND and/or XOR gates. Logic blocks may also include memory elements. The FPGA may be configured to control the flow to and from the SD card. For example, an FPGA may be configured using a Very High Speed Integrated Circuit (VHSIC) Hardware Description Language (VHDL) programming language to define digital and mixed-signal systems in the FPGA. Upon start up, the FPGA may be configured to, for example, to initialize non-volatile memory 190, start to capture MIL-STD-1553 data received at transceiver 130, buffer the captured data in internal buffers, and write the buffered data to non-volatile memory 190.

Additionally, it may be possible to implement some or all of logging device 110 to employ other physical hardware that incorporates discrete or programmable analog, digital and/or quantum hardware. Examples of other programmable hardware include: computers, microcontrollers, microprocessors, application-specific integrated circuits (ASICs); and complex programmable logic devices (CPLDs). Computers, microcontrollers and microprocessors are programmed using languages such as assembly, C, C++ or the like. ASICs and CPLDs are often programmed. Finally, it needs to be emphasized that the above-mentioned technologies may be used in combination.

Figure 2:
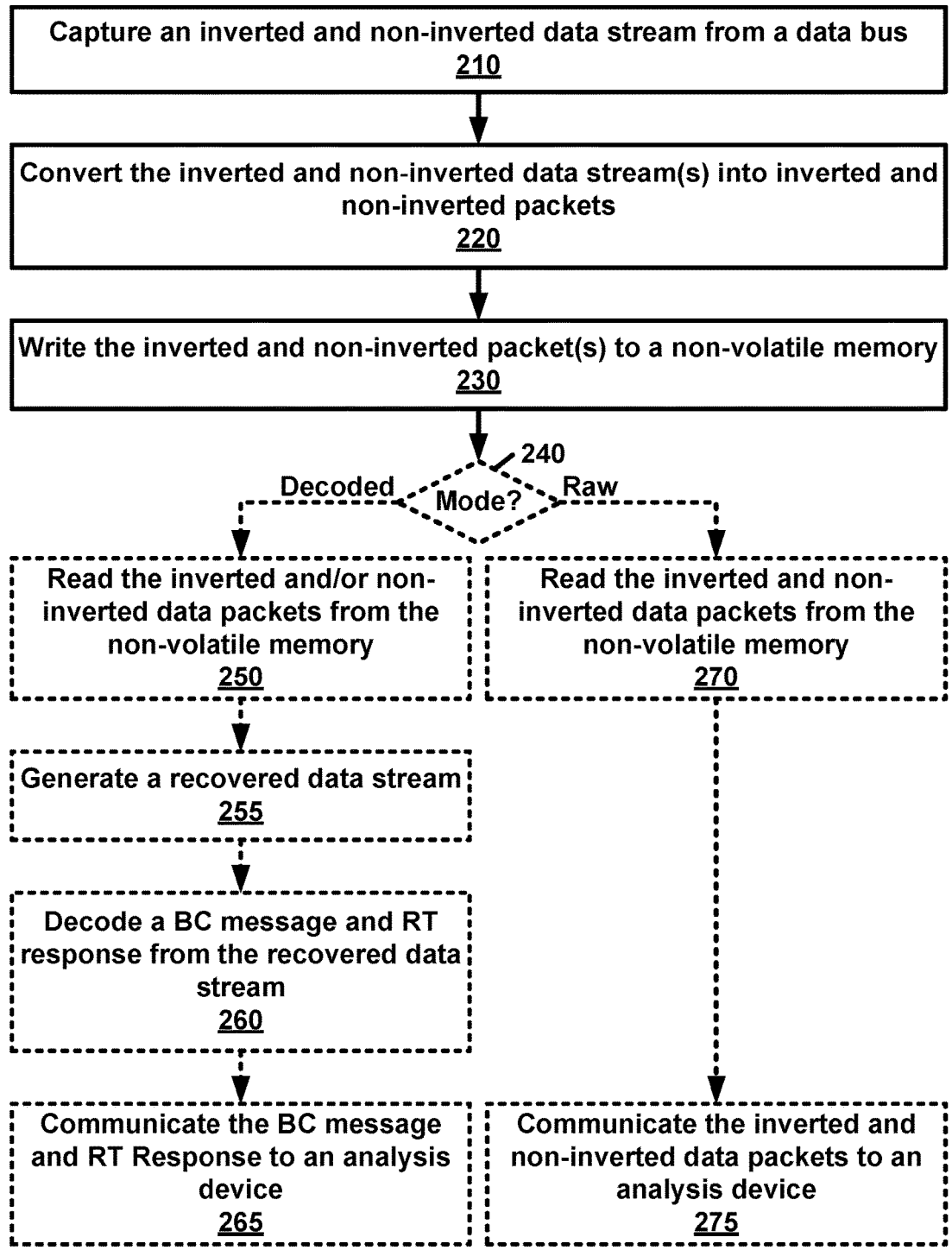
FIG. 2 illustrates an example process of capturing, writing and retrieving a data stream, in accordance with an embodiment of the present invention.

FIG. 2 is a flow diagram illustrating an example process of capturing a data stream from a shared data bus (e.g. 165), writing the data stream to a non-volatile memory (e.g. 190), and retrieving a data stream from the non-volatile memory (e.g. 190), in accordance with an embodiment of the present invention. A non-inverted data stream and/or an inverted data stream may be captured at a bus transceiver (e.g. 130) electrically coupled to a shared data bus (e.g. 165) at 210. The data bus (e.g. 165) may be a MIL-STD-1553 data bus. According to an embodiment, a sync pulse may be identified in the recovered data stream. The sync pulse may be configured to trigger the decoding of the bus controller message.

The non-inverted and/or inverted data stream may be converted into non-inverted and/or inverted packets having a packet size at 220. According to an embodiment, the packet size may be 512 bytes. It is envisioned that other packet sizes may be employed within the scope of the invention depending, for example, on the specific communication buses, non-volatile memory, and/or the like employed is an embodiment. The non-inverted packets and/or the inverted packet may have a block number. A cyclic redundancy check may be calculated for each of the non-inverted packets and the inverted packets The non-inverted data packets and/or inverted data packets may be written to a non-volatile memory (e.g. 190) at 230. The non-volatile memory (e.g. 190) may be initialized before use. The non-volatile memory (e.g. 190) may be an SD memory card. According to an embodiment, the non-inverted data stream and inverted data stream may be buffered.

Once date packets have been written to non-volatile memory (e.g. 190) at 230, one or more of the data packets may be optionally read back. In FIG. 2, dashes show process actions that may be optional in the illustrated example. Other embodiments may employ these optional actions.

A determination may be made at 240 as to whether non-inverted data packets and/or inverted data packets may be read back from the non-volatile memory (e.g. 190) in a decoded and/or raw mode. If the determination was made at 240 to read back non-inverted data packets and/or inverted data packets from the non-volatile memory (e.g. 190) in a raw mode, the non-inverted data packets and the inverted data packets may be sequentially read from the non-volatile memory (e.g. 190) at 270. The non-inverted data packets and the inverted data packets may be communicated to an analysis device (e.g. 180) via a communications port (e.g. 185) at 275.

If the determination was made at 240 to read back non-inverted data packets and/or inverted data packets from the non-volatile memory (e.g. 190) in a decoded mode, at least one of the non-inverted data packets and the inverted data packets may be read from the non-volatile memory (e.g. 190) at 250. A recovered data stream may be generated from at least one of the non-inverted data packets and the inverted data packets at 255. According to an embodiment, the recovered data stream may be generated by combining at least two of the non-inverted data packets and the inverted data packets. Recovering the data stream may include stitching packets together for messages that span multiple data packets. According to an embodiment, the bus controller message and/or remote terminal response may be stored for later access.

A bus controller message and/or a remote terminal response may be decoded from the recovered data stream at 260. The bus controller message and the remote terminal response may be output to the communications port (e.g. 140) at 265. According to an embodiment, the communications port (e.g. 140) may be a serial communications port.

Figure 3:
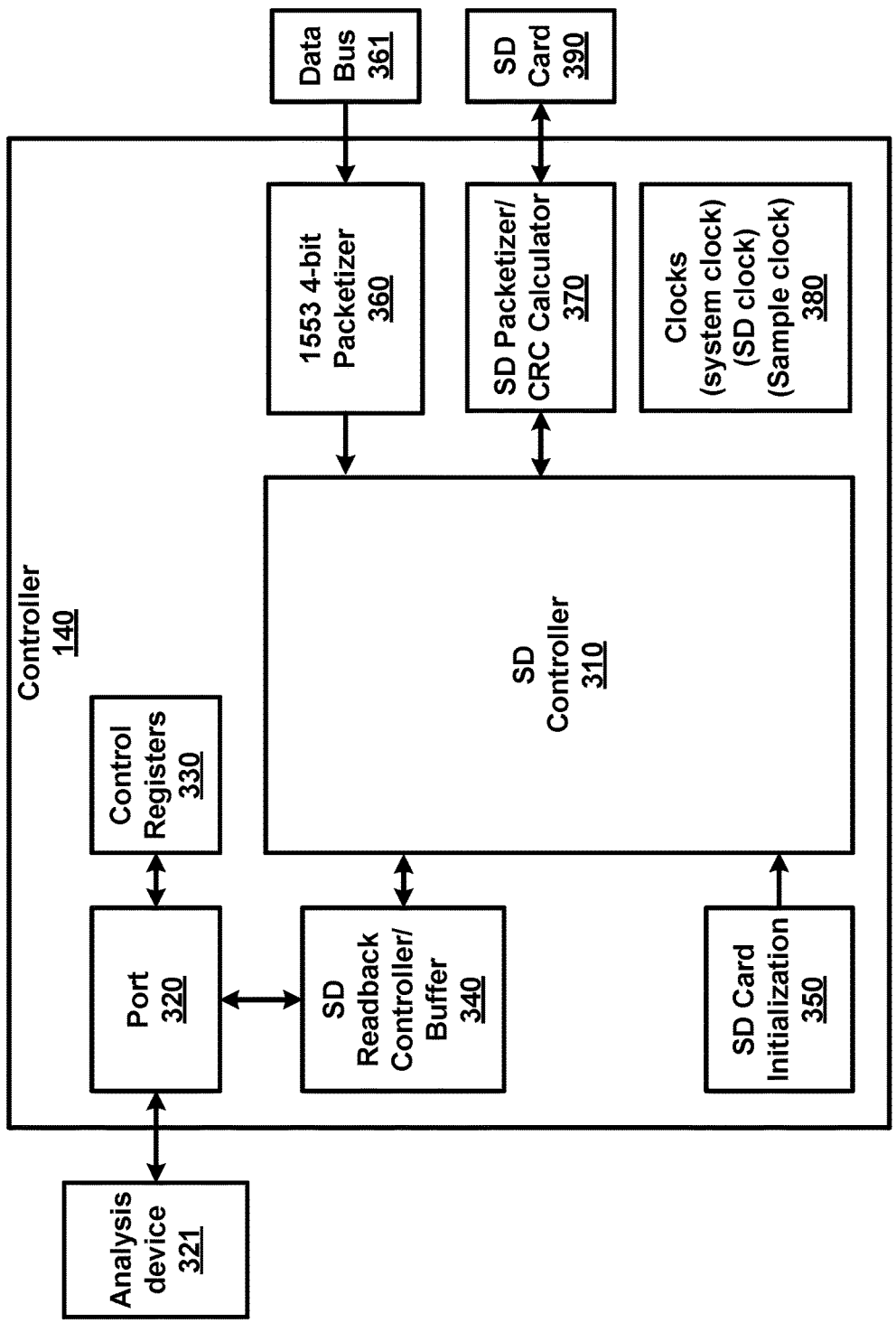
FIG. 3 is a block diagram of a controller according to one embodiment of the invention.

FIG. 3 is a block diagram of an example embodiment of controller 140. The controller 140 may include a SD controller 310. The SD controller 310 may employ one or more state machines to initialize an SD Card 390 and control read and write operations of SD Card 390. After an initialization sequence finishes upon power up of the system, the FPGA may accept commands through port 320. Port 320 may employ an interface such as, for example, an RS-232 interface, a USC interface, and RS-422 interface, and/or the like. The port 320 may be configured employing control registers 330. Control registers 330 may assist in aspects of serial communication such as, but not limited to: line control/management, buffer control/management, modem control/management, combinations thereof, and/or the like. Data collection may be interrupted by commands from analysis device 321 via port 320. Data from SD card 390 may be read back through the communication port 320 via SD Readback/Controller buffer 340 for external analysis by analysis device 321. While port 320 may be a serial port, it is envisioned that other implementations may also be employed. For example, port 320 may be an external port, such as an Ethernet port or a USB port or connector, as described below.

The SD controller 310 may follow the standard SD communication protocol provided by the international SD Group. (See Technical Committee SD Card Association, "SD Specifications Part 1 Physical Layer Simplified Specification, Ver 4.10, 22 Jan. 2013). The protocol may employ a bi-directional command line, clocks 380 and 4 bi-directional data lines. The 4 bi-directional data lines may couple SD Card 390 to a MIL-STD-1553 compatible 4-bit packetizer 360. Packetizer 360 may connect to a MIL-STD-1553 data bus 361. Controller 140 may also include a SD Packetizer/cyclic redundancy check (CRC) Calculator 370 coupled between the SD controller 310 and SD Card 390. SD Card Initialization component 350 may sequence through commands when power is applied. SD card 390 may include an internal microcontroller configured to respond to the commands.

Figure 4:
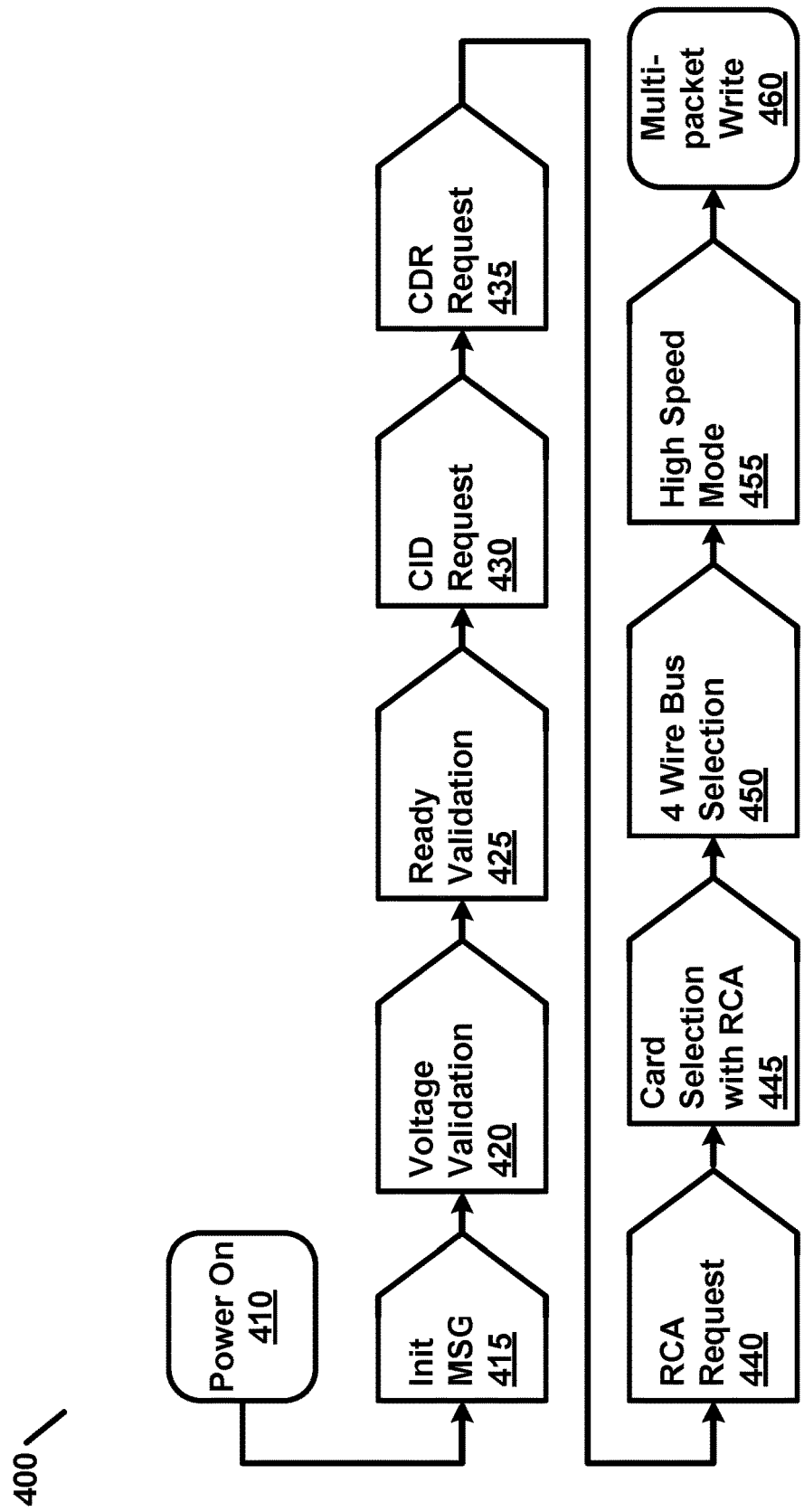
FIG. 4 is a flow diagram illustrating an example SD card initialization sequence according to one embodiment of the invention.

FIG. 4 is a flow diagram illustrating an example SD card initialization sequence 400. At 410, power may be applied to a SD card (e.g. 390). After power-on (at 410), the SD card's CMD lines may be set to an input mode, waiting for the start bit of a next command. The card may be initialized with a default relative card address (RCA) of 0x0000. At the start of communication between the SD controller 310 and the SD card (e.g. 390), the SD controller (e.g. 310) may not know the card supported voltage and the card may not know whether it supports the current supplied voltage. The SD controller (e.g. 310) may issue a reset command (for example, SD CMD0) at 415 with a specified voltage while assuming the specified voltage may be supported by the SD card (e.g. 390). To verify the voltage, a following new command (for example, SD command CMD0/CMD8) may be employed to verify that the SD card (e.g. 390) may operate using the specified voltage at 420 and that the SD card (e.g. 390) interface is in operating condition. The SD controller (e.g. 310) may check the validity of operating condition by analyzing the argument(s) of command CMD8 at 425. Individual Read/Write (RW) cards may have a unique identification number (CID). A CID Request may be made at 430 to learn the CID of the SD card (e.g. 390). The CID information may reside in a CID register. The CID register may be 128 bits long. A CDR request may be made at 435 followed by a RCA request at 440 to learn how to address the SD card (e.g. 390). The SD card (e.g. 390) may be selected at 445 using the RCA. A 4-wire bus section may be made at 450 to select the 4 parallel data line mode for communications with the SD card (e.g. 390). The high-speed mode may be selected at 455. The high-speed mode may set the SD card (e.g. 390) for 3.3V signaling with frequencies up to 50 MHz and data rates up to 25 MB/sec. At 460, the SD card (e.g. 390) may be programed for multi-packet (blocks) writing.

When data is sent over to a SD card (e.g. 390), the SD card (e.g. 390) may fill a 512-byte buffer on an internal microcontroller. The microcontroller may pull the data out of the buffer and write it into memory. Continuous writes to a SD card (e.g. 390) may not be possible because the card may be busy for a time after the 512 bytes are written. Data may be buffered until the SD card (e.g. 390) is ready for the next data packet.

Referring now to FIG. 5, the controller 140 may employ three clocks (e.g. 380): a system clock, a sample clock, and a SD clock. FIG. 5 is a table of example clock rates, in accordance with an embodiment of the disclosure. Other clock rates may be used in alternative embodiments. As illustrated in the example, the system clock is 100 MHz. The other two internal clocks may be derived from this clock to keep the clocks synchronous. This may keep some of the various embodiments from becoming too complicated due to clock(s) crossing boundaries. A sample clock may be 10 MHz and may be used to latch in samples from the MIL-STD-1553 bus so that the system over samples the bus by a factor of approximately 10. A SD clock may be 25 MHz. Data going to and from the SD card (e.g. 390) may be synchronized with this bus. While other clock speeds may be employed, the SD clock rate is preferably higher than the sample clock rate.

After the card initialization sequence is complete, a SD card writing engine may begin. The writing engine may run continuously. According to some of the various embodiments, the writing engine may run until a timer (configured by, for example, the dip switches) expires.

Figure 6:
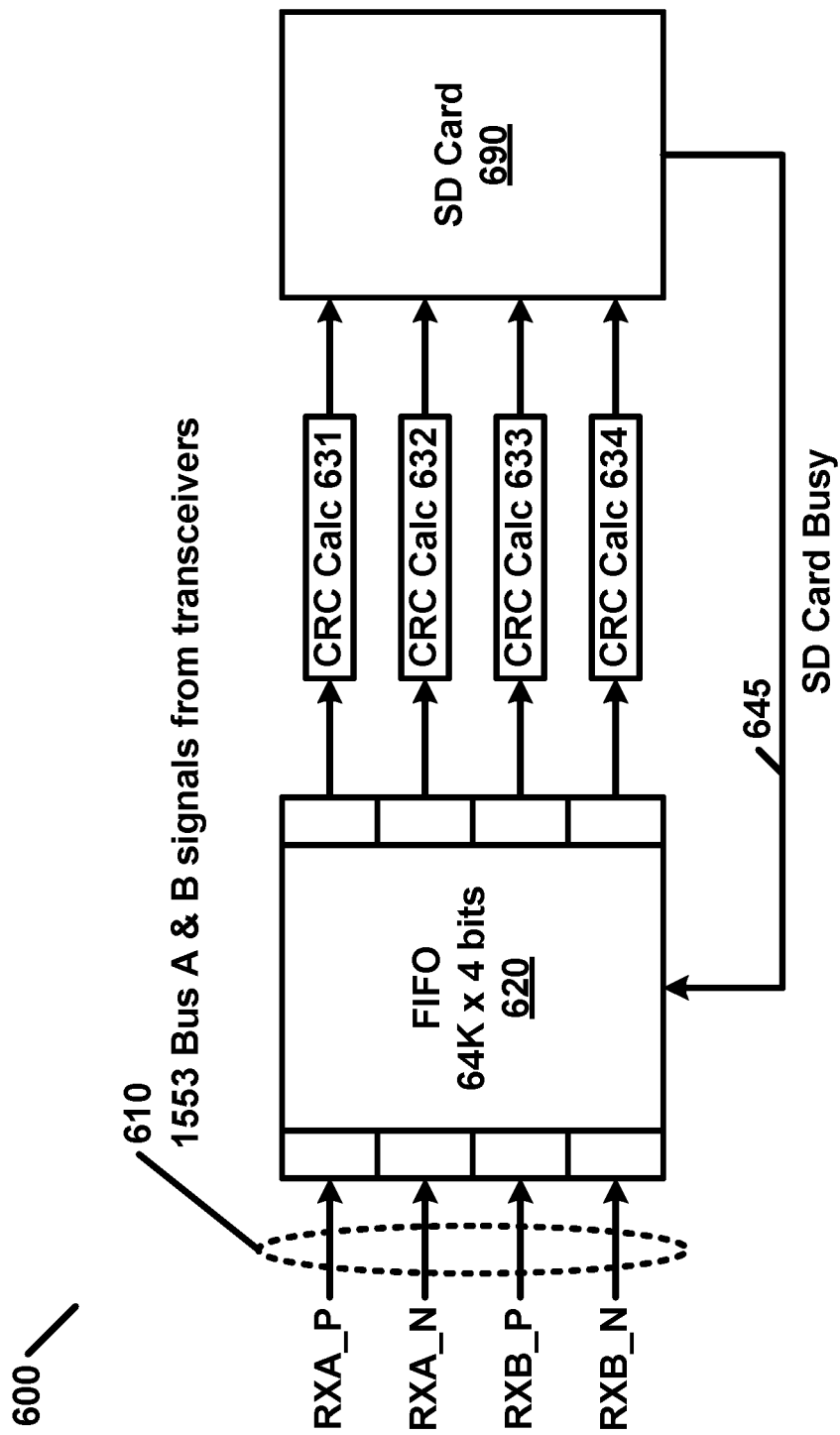
FIG. 6 illustrates an example process for writing data to an SD card in accordance with an embodiment of the present invention.

FIG. 6 is a block diagram of a SD card writing engine 600, in accordance with an embodiment of the disclosure. Four data lines 610 coming from MIL-STD-1553 transceiver(s) may be sampled at 10 MHz, aligned with each other, and stored in a First-In First Out buffer (FIFO) 620. The read side of the FIFO 620 may run at 25 MHz. The reading process may be controlled by a minimum data threshold and a SD card busy indicator 645. Whenever a packet is sent over to the SD card 690, the SD card 690 may respond with busy signal 645. The length of the SD Card busy signal 645 may be unpredictable, so the FIFO depth may be set sufficiently high (for example, at 65,536 addresses) to keep the writing side of FIFO 620 from overflowing. For this reason, the read side of FIFO 620 may be set at a much higher rate than the writing side. The time between buffering and writing data to the SD card 690 is variable. Data that is not written fast enough may be thrown away; however, the filter will still function.

Both the SD commands and SD data may employ CRC checks in the SD card 690 to validate that the data has not been corrupted on the bus. The CRC components (for example, 631, 632, 633 and 634) for the SD card 690 writes are illustrated in FIG. 6. The CRC may be appended to the end of both types of communication. The CRCs may be calculated in (or near) real-time due to the continuous capture rate. This may be accomplished employing shift registers. As the values come into the components, a '1' may cause the shifted data to be XOR'd with a polynomial. If a zero occurs, nothing happens and the data may shift again. This continues until all the data has gone through the shift register.

The SD command may create a 7-bit CRC and may use the polynomial: $x^7+x^3+1$. The SD data may create a 16-bit CRC and use the polynomial: $x^{16}+x^{12}+x^5+1$.

Figure 7:
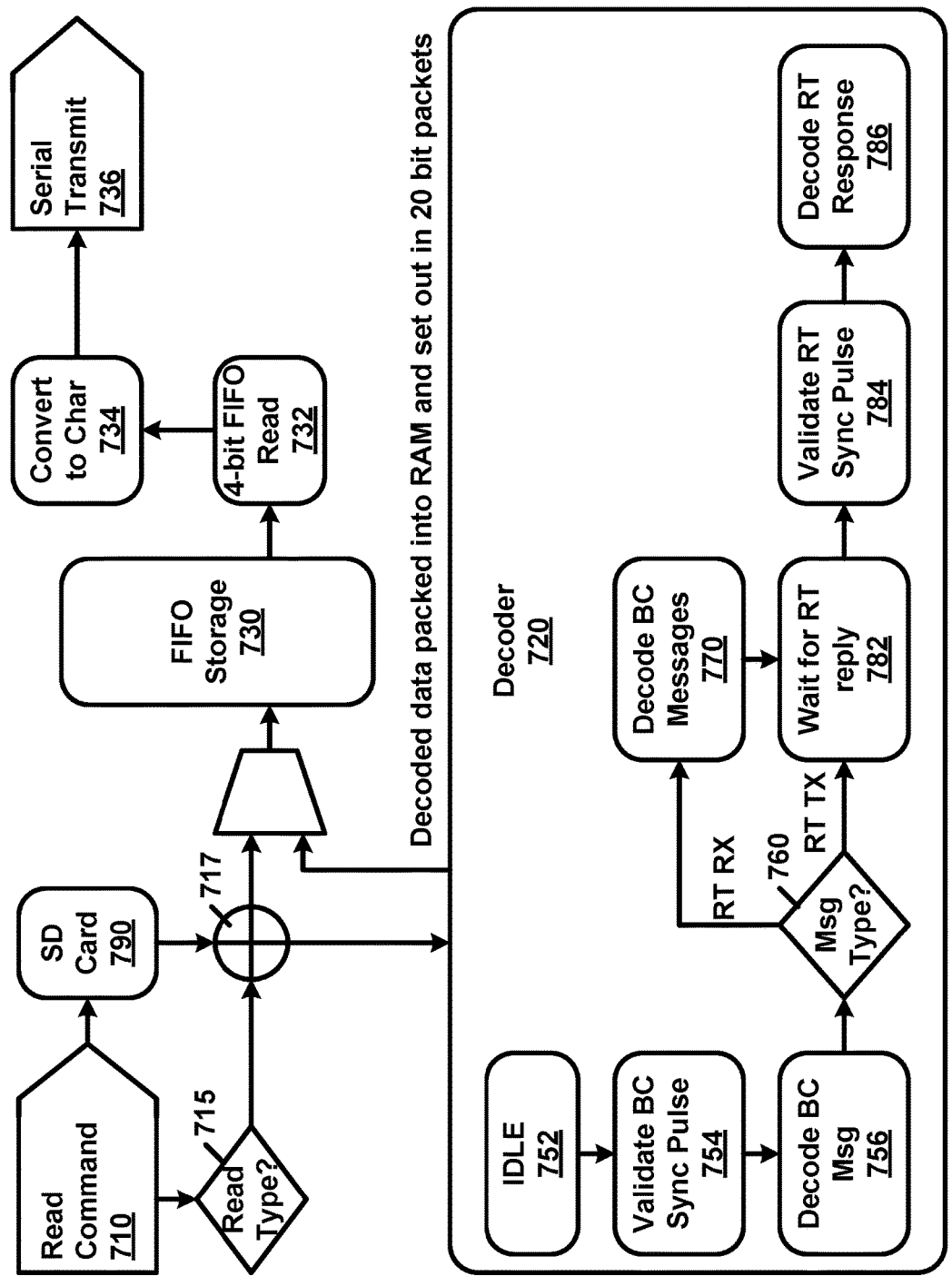
FIG. 7 illustrates a process for reading data from an SD card, in accordance with an embodiment of the present invention.

FIG. 7 is a diagram illustrating example mechanisms to read data out from a SD card 790, in accordance with an embodiment of the disclosure. According to various embodiments, SD card 790 may be SD Card 190, 390, and/or 690. The process of reading the data out of the SD card 790 does not have to be continuous like the writing process. The user may have two options when it comes to SD card 790 reading. The first process reads each block sequentially out of the SD card 790 and push the collected data over a serial port at 736 to an analysis device (e.g. 180, 321). The second process reads multiple blocks of data from the SD card 790 and run the data through a MIL-STD-1553 decoder 720 before pushing the data across the serial port at 736. Decoder 720 may be implemented as state machine. Embodiments of both processes are illustrated in FIG. 7.

A read command 710 may be issued by a SD controller through the serial port at 710 to SD card 790. The SD card 790 may respond with, for example, a 4096-bit packet that was stored in the address space specified in the read command. A determination may be made at 715 to which process is to be performed with the raw data: process one where raw data is sent over a serial port at 736, or process two where decoded data is sent over a serial port at 736. If the data is to be forwarded in raw form, switch 717 may route the raw data from SD Card 790 directly to FIFO 730. If the raw data is to be decoded first, switch 717 may route the raw data from SD Card 790 to decoder state machine 720.

The first process, involving reading raw captured data, may be employed to perform a fine search of data if an error has occurred on the MIL-STD-1553 bus. Each of the 4 signals may be viewed within a GUI on an analysis device (e.g. 180, 321) and evaluated for errors manually. However, pushing all the data across the serial port at 736 may take a long time, especially, when a large number of blocks need to be analyzed. This data may be held in FIFO 730 while the serial port at 736 sends the data back to the user. Before going out through the serial port at 736, each set of 4-bit reads from the FIFO at 732 may be converted to an 8-bit ASCII character at 734 for the serial connection at 736.

The second method follows the same route as the first, but intercepts the return data at switch 717 from the SD card 790 and processes the raw data with decoder 720. This may be helpful for reducing the overall amount of data which needs to be sent across the serial link at 736. This second process may also help save analysis time because the raw data has been processed by the decoder state machine 720 instead of some other external program such as MATLAB®.

The decoder 720 may sit in an idle state 752 until a valid BC sync pulse is detected at 754. The BC message may be decoded at 756. If the message is determined at 760 to be a RT RX message, the message may be decoded as a BC message at 770. If the message is determined at 760 to be a RT TX message, the decoder state machine 720 may wait for a RT reply at 782. Once a RT sync pulse is validated at 784, the decoder state machine 720 may decode the RT response from the data stream at 786. In other words, this process may capture the entire message and then uses that information to determine if the following packets will be from the BC or are a request for packets from the RT. Those packets may be decoded and stored and then the gap between the end of the BC transmission and the RT response may be captured. All this data may be recorded and stored in, for example, a 38 address×20 bits RAM (not shown).

FIG. 8 is a table illustrating the order of decoded data in RAM, in accordance with an embodiment of the invention. Once the last packet has been captured in this communication sequence or if a timer has expired at any point in the process, all the data in the RAM may be forwarded for transmission out through the serial link at 736. The decoded message and/or raw data may be forwarded to FIFO storage 730. Four-bit data reads may be made from the FIFO 730 at 732 and converted into characters at 734 for transmission to an external analysis device at 736.

Data analysis of the data transmitted by serial transmission component 736 may be performed by an analysis device (e.g. 180, 321). The analysis device (e.g. 180, 321), may, according to one of the various embodiments, employ a software analysis component operating in combination with computing hardware. The software component may be written, for example, employing Labwindows™ CVI and a computing language such as C. The software may be employed to communicate to the logging device (e.g. 110) via a port such as the RS-communication port 140 shown in FIG. 1. The software component may formulate messages with the address and data fields to program registers in the controller (e.g. 120). In addition, the software component may parse RS-232 messages received from the controller (e.g. 120). One of the messages received may include data from the non-volatile memory (e.g. 190).

According to an embodiment, an analysis device (e.g. 180, 321) may receive data from communications port 140 as ASCII characters. The software component may convert the ASCII characters to an integer value. The binary equivalent of the integer may be parsed and sequenced in the original bus arrays. The bus arrays which represent the sampled bus over time may be plotted in a digital data graph.

The logging device (e.g. 110) may be designed to be powered by a single 5-volt source through, for example, an external power source. The external power source may be supplied via port 320, and/or an additional connector such as a USB connector. When power is applied to the logging device (e.g. 110), a SD Card initialization procedure (e.g. 400) may begin. Initialization LED(s) may be configured to indicate that the logging device (e.g. 110) (or components within) has been initialized. Other indicators are possible, such as, for example, a sound. The controller (e.g. 120) may begin recording data to the SD card (e.g. 190) beginning at, for example, block 0. This may be indicated by configuring LED(s) to flash.

The logging device (e.g. 110) may need to go through a power up sequence (e.g. 400) when power is applied. However, the logging device (e.g. 110) may be configured so that if a lock on the non-volatile memory (e.g. 190) is active, the non-volatile memory (e.g. 190) will be initialized but the existing data on the non-volatile memory (e.g. 190) will not be over written. If the non-volatile memory (e.g. 190) is locked, a non-volatile memory Write Protected LED may be configured to be read. This mode of operation may be employed to retrieve data from the non-volatile memory (e.g. 190) for analysis.

There may be reasons to not collect data for the maximum amount of time. For example, it may be desired to collect data for a small amount of time in order to verify a test setup. Therefore, according to an embodiment, the length of the collection may be configured and controlled by start-up hold switch(es). The collect times may be configured for various periods of time such as, for example, 2 minutes, 10 minutes, 4 hours and 10 hours depending on the position of the switches (e.g. '00', '01', '10' or '11).

To read back the data to an analysis device (e.g. 180, 321), the logging device (e.g. 110) may be powered up with a write protect switch activated on the non-volatile memory (e.g. 190). If the switch is not activated, the data may be overwritten. A USB connector may be connected to an analysis device (e.g. 180, 321) as well as an RS-232 connector on the logging device (e.g. 110). A connector may provide power to the logging device (e.g. 110) and a port (e.g. 320) connector may be employed to transfer the data to the analysis device (e.g. 180, 321) at various baud rates, for example, at 155 k Baud.

According to an embodiment, a graphical user interface (GUI) may be started on the analysis device (e.g. 180, 321). A "connect" button may be activated to determine if the analysis device (e.g. 180, 321) is connected correctly to the logging device (e.g. 110). Data may appear in the GUI's history panel. An address field may be changed to 17 and a data field to 00000000. Seventeen may be employed as the command for the SD card (e.g. 190) to read back one block of data. The data field may be the address of the block in the SD card (e.g. 190). The data field may be changed to other hex values to read back other addresses than zero. Activating a Write button may send a command to a SD card (e.g. 190), causing a response from the logging device (e.g. 110) with 512 bytes of data. Once the response from the logging device (e.g. 110) is received at the analysis device (e.g. 180), the data may be plotted on a screen as individual busses.

Although the subject matter has been described in language specific to system features and/or instructions, it is to be understood that the subject matter defined in the appended claims is not necessarily limited to the specific features or instructions described above. Rather, the specific features and instructions described above are disclosed as example forms of implementing the claims.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on employing an FPGA to analyze a MIL-STD-1553 shared data bus in an avionics system. However, one skilled in the art will recognize that embodiments of the disclosure may employ devices other than FPGA's (for example, discrete logic, ASICs, fast processor devices, and/or combinations thereof) to analyze other types of data buses (such as shared data buses employing MIL-STD-1773 and/or RS-422 buses) in other systems (such as a supervisory data acquisition system).

What is claimed is:

1. A device comprising:
a bus transceiver electrically coupled to a data bus comprising an inverted differential line and a non-inverted differential line; and
a controller electrically coupled to the bus transceiver and configured to:
capture a non-inverted data stream from the bus transceiver;
capture an inverted data stream from the bus transceiver;
convert the non-inverted data stream into non-inverted packets having a packet size;
convert the inverted data stream into inverted packets having the packet size; and
write the non-inverted data packets and inverted data packets to a non-volatile memory; and
the controller further configured to:
read, from the non-volatile memory, at least one of the non-inverted data packets and the inverted data packets;
generate a recovered data stream from at least one of the non-inverted data packets and the inverted data packets;
decode from the recovered data stream:
a bus controller message; and
a remote terminal response; and
communicate to an analysis device, via a communications port, the bus controller message and the remote terminal response.

2. The device according to claim 1, where the controller is further configured to buffer the non-inverted data stream and the inverted data stream.

3. The device according to claim 1, further comprising a second bus transceiver electrically coupled to a second data bus comprising a second inverted differential line and a second non-inverted differential line.

4. The device according to claim 1, where the data bus is a MIL-STD-1553 data bus.

5. The device according to claim 1, where the non-volatile memory is an SD memory card.

6. A device according to claim 1, where the controller is further configured to:
sequentially read, from the non-volatile memory, the non-inverted data packets and the inverted data packets; and
communicate to an analysis device, via a communications port, the non-inverted data packets and the inverted data packets.

7. The device according to claim 1, where the controller is further configured to store:
the bus controller message; and
the remote terminal response.

8. A method comprising:
capturing a non-inverted data stream from a bus transceiver electrically coupled to a data bus;
capturing an inverted data stream from the bus transceiver;
converting the non-inverted data stream into non-inverted packets having a packet size;
converting the inverted data stream into inverted packets having the packet size; writing the non-inverted data packets and inverted data packets to a non-volatile memory;
reading, from the non-volatile memory, at least one of the non-inverted data packets and the inverted data packets;
generating a recovered data stream from at least one of the non-inverted data packets and the inverted data packets;
decoding from the recovered data stream:
a bus controller message; and
a remote terminal response; and
outputting the bus controller message and the remote terminal response to a communications port.

9. The method according to claim 8, further comprising buffering the non-inverted data stream and inverted data stream.

10. The method according to claim 8, where the data bus is a MIL-STD-1553 data bus.

11. The method according to claim 8, further comprising:
sequentially reading, from the non-volatile memory, the non-inverted data packets and the inverted data packets; and
communicating to an analysis device, via a communications port, the non-inverted data packets and the inverted data packets.

12. The method according to claim 8, where the generating the recovered data stream further comprises combining at least two of the non-inverted data packets and the inverted data packets.

13. The method according to claim 8, further comprising storing:
the bus controller message; and
the remote terminal response.

14. A system comprising:
a data bus comprising an inverted differential line and a non-inverted differential line;
at least one bus controller electrically coupled to the data bus;
at least one remote terminal electrically coupled to the data bus; and
a logger comprising:
a bus transceiver electrically coupled to the data bus; and
a controller electrically coupled to the bus transceiver and configured to:
capture a non-inverted data stream from the bus transceiver;
capture an inverted data stream from the bus transceiver;
convert the non-inverted data stream into non-inverted packets having a packet size;
convert the inverted data stream into inverted packets having the packet size; and
write the non-inverted data packets and inverted data packets to a non-volatile memory;
the controller further configured to:
read, from the non-volatile memory, at least one of the non-inverted data packets and the inverted data packets;
generate a recovered data stream from at least one of the non-inverted data packets and the inverted data packets;
decode from the recovered data stream:
a bus controller message; and
a remote terminal response; and
communicate to an analysis device, via a communications port, the bus controller message and the remote terminal response.

15. The system according to claim 14, where the data bus is a MIL-STD-1553 data bus.

16. The system according to claim 14, where the non-volatile memory is an SD memory card.

17. The system according to claim 14, where the controller is further configured to:
sequentially read, from the non-volatile memory, the non-inverted data packets and the inverted data packets; and
communicate to an analysis device, via a communications port, the non-inverted data packets and the inverted data packets.

\* \* \* \* \*